Figure 1:
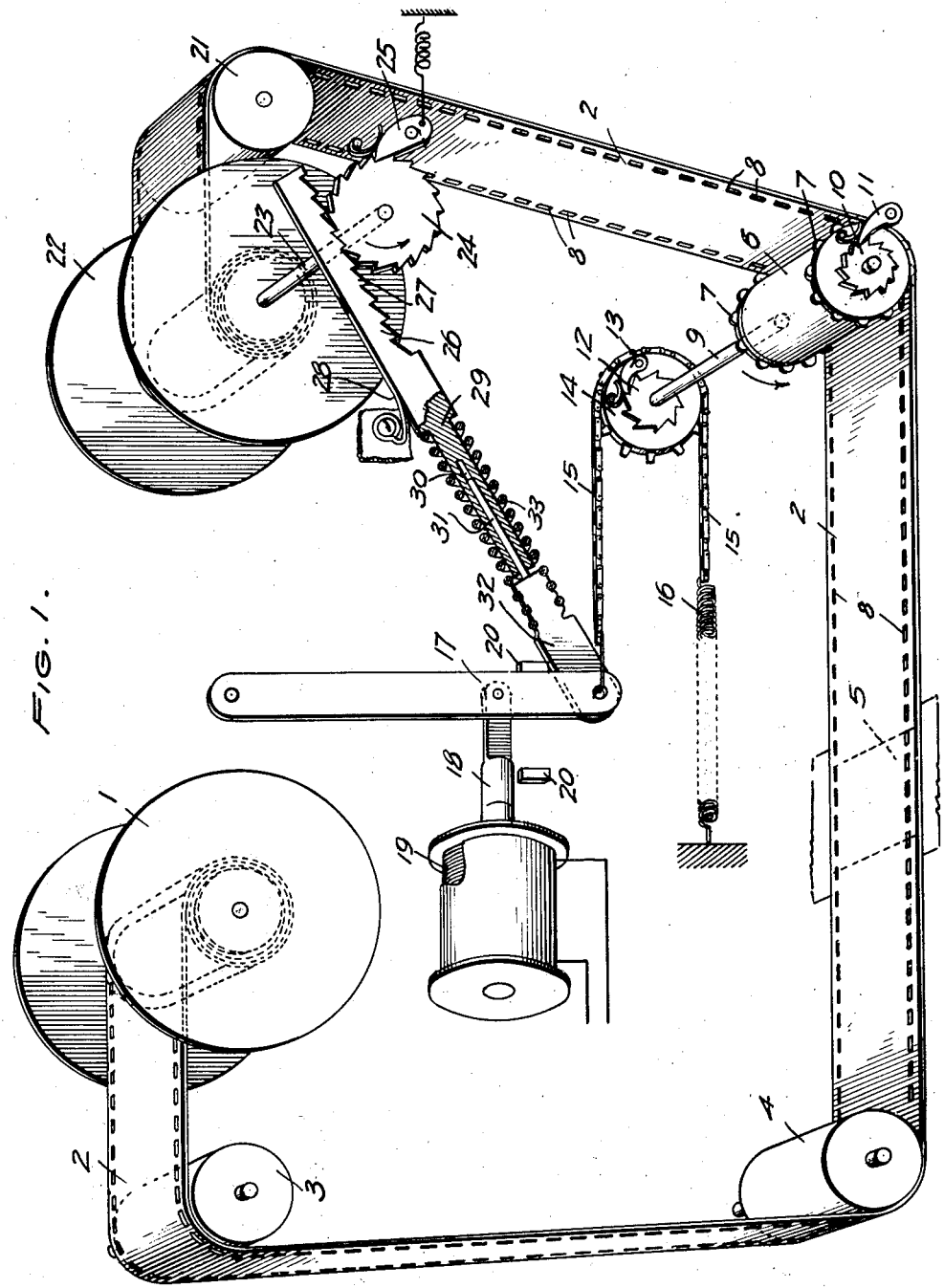

Feb. 16, 1943.    W. R. FISCHER    2,310,947
AUTOMATIC TAKE-UP DEVICE
Filed Aug. 23, 1941    2 Sheets-Sheet 1

INVENTOR
WILLIAM R. FISCHER
ATTORNEYS

Feb. 16, 1943.   W. R. FISCHER   2,310,947
AUTOMATIC TAKE-UP DEVICE
Filed Aug. 23, 1941   2 Sheets-Sheet 2

INVENTOR
WILLIAM R. FISCHER

Patented Feb. 16, 1943

2,310,947

UNITED STATES PATENT OFFICE 2,310,947

AUTOMATIC TAKE-UP DEVICE

William R. Fischer, Dayton, Ohio

Application August 23, 1941, Serial No. 408,066

1 Claim. (Cl. 242—55)

(Granted under the act of March 3, 1883, as amended April 30, 1928; 370 O. G. 757)

The invention described herein may be manufactured and used by or for Government for governmental purposes, without the payment to me of any royalty thereon.

This invention relates to apparatus for actuating a take-up spool or reel upon which photographic film or other strip material is to be intermittently wound and provides means for compensating for the decreased angular movement of the take-up reel as the radius of the material wound thereon increases. The invention is particularly adapted for use in cameras employing roll film but can be applied wherever a similar problem arises, such as where paper strip is intermittently processed such as by printing, and then wound on a take-up roll.

In roll film feeding apparatus such as employed in cameras a predetermined length of film is intermittently unwound from a film supply spool and brought into register with an aperture behind the lens system for exposure and after exposure the feeding mechanism causes another length of film to be brought into register with the said aperture and causes the exposed film to be wound on a take-up spool. As the exposed film is wound on the take-up spool the increasing diameter thereof requires a decreasing angular rotation of the take-up spool to accommodate the constant lengths of exposed film wound thereon and thus precludes the use of a fixed ratio drive between the film feeding mechanism and the take-up roll. In cameras where a large quantity of film is successively exposed the problem of driving the take-up spool to compensate for the increased diameter and also to take up slack in the exposed film is serious, and various expedients have been used in the prior art, such as variable ratio intermittent rotary drives controlled by the radius of the film wound on the take-up spool and a slipping friction drive, such as a resilient belt interconnecting the film feeding means and the take-up spool. The variable ratio intermittent drive inherently requires a large number of parts which are difficult to maintain in adjustment and the above noted slipping drive becomes very uncertain in action and with either type of prior art take-up spool drive troubles from damaged film due to accumulation of slack and torn film due to excessive tensioning during reeling are of frequent occurrence.

In order to overcome the difficulties encountered in the prior art devices, the present invention provides a feeding means such as a toothed roller for causing a withdrawal of a predetermined length of strip material from a supply spool, the feeding roller being intermittently actuated through a one-way driving device which includes an element such as a pivoted lever movable between limiting positions, the take-up spool also being provided with a one-way driving means actuated by a resilient link connecting the same to the said movable element, the said resilient link being operative during movement of said element in one direction to cause a rotation of the take-up spool to wind the exposed film or other strip material thereon but upon a predetermined tension being exerted on the film the resilient link permits the movable element to complete its motion without causing further rotary movement of the take-up spool except to take up existing slack in the material being reeled. The resilient link is so constructed that the winding torque exerted on the take-up spool is never sufficient to cause an excessive tension on the film or other strip material. By means of the device in accordance with the invention all slack in the strip between the feed roller and the take-up spool is taken up immediately and the resilient link permits the proper angular rotation of the take-up spool to wind on the strip irrespective of the diameter of the material wound on the spool without requiring complicated variable ratio levers or slipping friction drives.

It is therefore the principal object of the invention to provide in a device for intermittently withdrawing a predetermined length of strip material from a supply spool or reel and winding an equal length of the material on a take-up spool or reel; of an intermittently actuated one-way feeding means for causing the withdrawal of the predetermined length of strip material from the supply spool including a movable element movable alternately between limiting positions, a one-way drive for the take-up spool and an operative connection between the said movable element and said one-way drive including a resilient link which permits said movable element to complete its motion in one direction without causing more than a predetermined torque to be exerted on said take-up spool.

Figure 2:
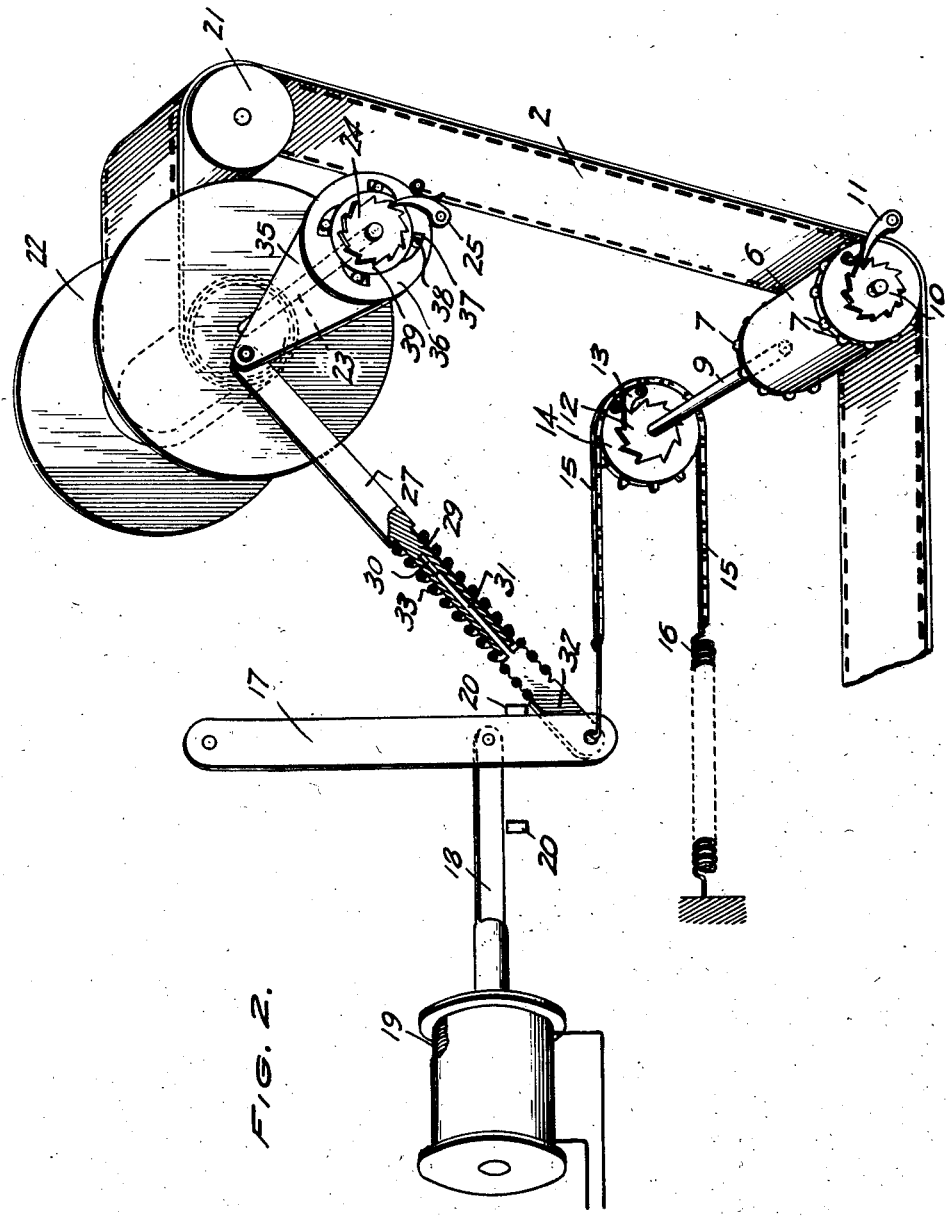

Other objects of the invention will appear by reference to the detailed description hereinafter given and to the appended drawings in which:

Fig. 1 is a diagrammatic illustration of the principal elements of one form of the invention, and Fig. 2 is a partial view similar to Fig. 1 illustrating a modified form of the invention.

Referring now to Fig. 1, reference numeral 1 indicates a supply spool or reel adapted to contain unexposed photographic film or other thin strip material, the spool being provided with a suitable friction brake (not shown) to prevent over-running of the reel as film is withdrawn therefrom. The film, or strip material 2, is led over suitable guide rollers 3 and 4 past an aperture 5 located, for example, in a camera behind the lens portion thereof in a manner well known in the art. The film 2 then passes over a feed roller 6 which is provided with sprocket teeth 7 at each end thereof, which are adapted to engage slots 8 formed in the film adjacent the marginal edges thereof so as to cause a positive feeding motion of the film upon rotation of the feed roller 6. The roller 6 is adapted to be rotatably journalled by means of a shaft 9 which has a ratchet gear 10 secured to the outer end thereof and which co-operates with a holding pawl 11 to prevent clockwise rotation of the feed roller 6. At its other end the shaft 9 is provided with a similar ratchet wheel 12, which co-operates with a spring pressed pawl 13 pivotally mounted on a sprocket 14 which is freely rotatably mounted on the shaft 9. The pawl 13 and ratchet wheel 12 together form a well-known type of one-way drive whereby the sprocket 14 may drive the shaft 9 and feed roll 6 in a counterclockwise direction, as seen in Fig. 1, but allowing free rotation of the sprocket 14 relative to the ratchet 12 and shaft 9 in a clockwise direction. A chain 15, adapted to co-operate with the teeth on sprocket 14 is secured at one end to a restraining spring 16 and at its other end is connected at the lower end of a pivoted lever 17, the latter being pivotally connected intermediate its ends to a plunger 18 adapted to be actuated by means of an electrical solenoid winding 19. The winding 19 is adapted to be energized intermittently from a suitable source of current supply by means of a manually actuated or motor driven switch in a manner forming no part of the present invention. Every time the solenoid coil 19 is energized, the plunger 18 will be pulled axially to the left, as seen in Fig. 1, to cause a movement of the pivoted lever 17 from one extreme position to the other, as determined by the stops 20, which may be adjustable to suit varying needs. As the lever 17 is moved from the position shown in Fig. 1, the chain 15 will cause rotation of the sprocket 14, which through pawl 13 and ratchet 12, will cause an angular rotation of shaft 9 and feed roll 6 to thereby cause a predetermined amount of film to be withdrawn from the supply spool 1, causing a new length of film to be framed over the aperture 5. After the lever 17 has reached the extreme left hand stop 20 and the solenoid coil is de-energized, spring 16 will cause a return of the lever 17 to the position as shown in Fig. 1, but the pawl 13 will become disengaged from ratchet wheel 12 and allow free rotation of the sprocket 14 relative to shaft 9, and pawl 11 and ratchet wheel 10 prevent any reverse rotation of the feed roll 6.

The film 2 after passing over the feed roll 6 is led over a guide roller 21 onto a take-up spool 22 upon which the exposed film is wound. The take-up spool 22 is adapted to be rotatably mounted by shaft 23 which is provided at its inner end with a toothed ratchet wheel 24 which co-operates with a spring pressed pawl 25 to prevent rotation of the take-up spool 22 in a clockwise direction, as seen in Fig. 1. A link member 26, provided with rack teeth 27 on its underside, is so positioned that the teeth 27 engage the teeth of ratchet wheel 24 and are yieldingly maintained in contact therewith by means of a flexible spring 28. The element 26 forms one part of a yielding or resilient link and has it outer end formed as a circular stem 29, which is bored as at 30 to serve as a guide for a stem 31 formed on the outer end of a second portion 32 of the resilient link. A spring 33 surrounding the circular portion 29 is connected at each end thereof respectively to the link portions 26 and 32. The spring 33, as illustrated in the drawings for the sake of clarity is much larger than actually used in practice, the size of the spring being only that sufficient to transmit the necessary force to cause rotation of the ratchet wheel 24, but yielding upon the attaining of a predetermined torque on the take-up roll 22. The portion 32 of the resilient link is connected at its outer end to the lower end of lever 17.

As the lever 17 is moved from the position as shown in Fig. 1 to engage the left hand stop 20, causing a feeding of the predetermined length of film past the aperture 5, as previously described, the resilient link, including parts 26 and 32 and spring 33, will act at first as a rigid link causing the rotation of ratchet wheel 24 in the counterclockwise direction, as seen in Fig. 1, and causing a corresponding angular rotation of the take-up spool 22, so that the slack created between the feed roll 6 and the take-up spool 22 is immediately wound upon the latter. As the lever 17 completes its movement the torque exerted on the take-up roll will increase so that the tension on spring 33 is also increased, causing the spring to elongate and allow the further movement of lever 17 without an appreciable increase in the torque exerted on the take-up spool 22 and allowing a rotation thereof only sufficient to take up all slack in the exposed film as the same is advanced by the feed roll 6. Return motion of the lever 17 to its initial position, as seen in Fig. 1, causes a similar motion of the resilient link, including parts 32, spring 33 and rack 27, the teeth of which slip over the teeth of ratchet wheel 24 and allow a free relative motion therebetween, pawl 25 preventing any counterclockwise rotation of ratchet wheel 24 and take-up spool 22. It is thus seen that the rack teeth and ratchet wheel 24 constitutes a one-way driving mechanism for rotating the take-up spool 22 in a counterclockwise direction as seen in Fig. 1. It will be apparent that in the mechanism described the tension of spring 33 during operation of lever 17 and feed roll 6 will always be such as to create a sufficient torque on the take-up spool 22 to prevent the accumulation of any slack in the exposed film, and by the resilient link, formed by parts 26, 32 and 33, the torque exerted on the take-up spool 22 can be so adjusted that it is always sufficient to take up slack but not of such a value as to create an excessive tension on the exposed film. It is also seen that irrespective of the radius of the film or other strip material wound upon the take-up spool 22, the resilient linkage and one-way drive for the spool 22 insures that the latter will be rotated through the proper angular amount to take up the slack film caused by rotation of the feed roll 6.

Fig. 2 illustrates a modified form of the device of Fig. 1 in which all parts are identical with the device of Fig. 1 with the exception that the one-way driving function of ratchet 24 and rack teeth 27 is replaced by means of a lever 35 which is formed with an annular hub portion 36 provided with arcuate grooves 37 which house rollers 38 and form a well-known type of over-running or one-way clutch device adapted to drive a disc 39 secured to shaft 23 to cause rotation of take-up spool 22 in the counterclockwise direction. The ratchet wheel 24 and pawl 25 are employed in this modification only for preventing return rotation. The action of the device as seen in Fig. 2 is exactly similar to that described in Fig. 1 with the exception that the lever 35 and one-way clutch parts 37, 38 and 39 are employed to cause a counterclockwise rotation of the shaft 23. The device of Fig. 2 has the advantage of being more adapted for high speed operation, since the clashing of the rack teeth with the teeth of ratchet 24 during the reverse motion of the rack is avoided. While the feeding and take-up apparatus described above is illustrated in connection with the film feeding in a photographic camera or the like, it is to be understood that the invention is applicable to any machine involving the feeding of strip material in predetermined lengths which must be intermittently positioned and then wound upon a take-up spool. It is also to be understood that other forms of resilient linkage than shown may be substituted to interconnect the one-way drive of the take-up spool 22 and the lever 17.

While I have described the preferred embodiments of my invention, it will be clear to those skilled in the art that many modifications and variations may be made therein falling within the scope of the invention as defined by the appended claim.

I claim:

In a photographic film feeding device, a feed roller adapted to be intermittently actuated to feed a predetermined length of film from a supply spool into register with an exposure aperture, a one-way driving means for said feed roller, an intermittently actuated movable element movable in opposite directions between predetermined limits, a connection between said movable element and the one-way driving means for said feed roller, whereby motion of said element in one direction causes actuation of said feed roller, a take-up spool for receiving exposed film, a one-way driving means for said take-up spool, a link interconnecting the one-way driving means for said take-up spool, and said movable element for driving said take-up spool simultaneous with the driving of said feed roller, and said link including a slip connection permitting a limited extension and retraction thereof, and a resilient means yieldingly resisting extension of the link.

WILLIAM R. FISCHER.